Nov. 26, 1929.   L. E. RUF   1,737,059
CUSPIDOR
Filed Feb. 14, 1929
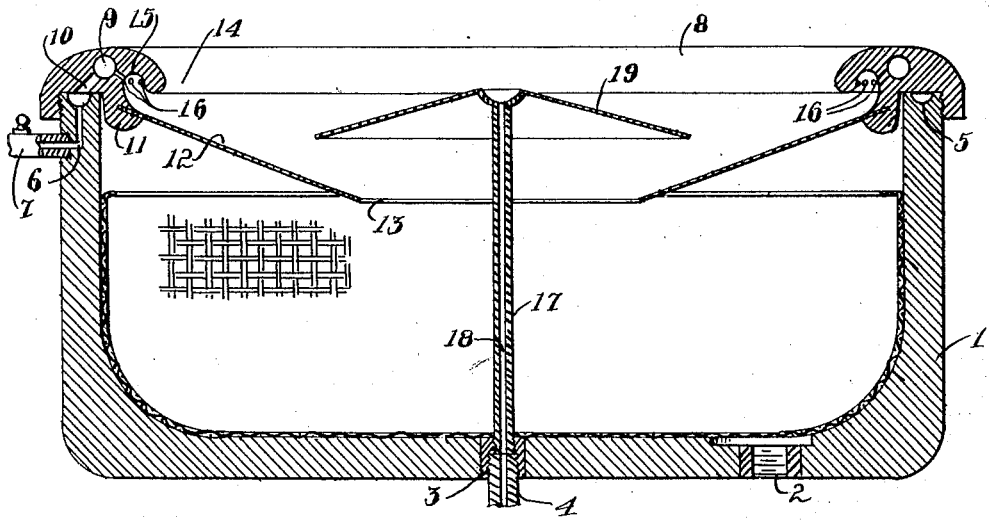
INVENTOR
Land E. Ruf
John A. Naismith
ATTORNEY

Patented Nov. 26, 1929

1,737,059

UNITED STATES PATENT OFFICE

LAUD E. RUF, OF SAN JOSE, CALIFORNIA

CUSPIDOR

Application filed February 14, 1929. Serial No. 339,794.

It is the object of the present invention to provide a cuspidor that will at all times present a clean and neat appearance to the eye of the beholder, and one that may be quickly and easily disassembled for emptying and cleaning, and as quickly and easily reassembled for use.

It is also an object of the invention to provide a device of the character indicated that will be economical to manufacture, simple in construction, and highly efficient in its practical application.

In the drawing, the figure shows a vertical transverse section through a cuspidor embodying my invention.

Referring now more particularly to the drawing, I show at 1 a bowl of any suitable material and size and fitted with a drain at 2. In the center of the bottom of the bowl is mounted a threaded ferrule 3 having a water supply pipe screwed into its bottom as at 4. In the upper edge of the bowl is formed an annular groove as shown at 5, and a conduit 6 is shown communicating with this groove and with a water supply pipe as 7.

At 8 is shown an annular rim threaded on to the bowl 1 and having a conduit 9 formed therein as shown. A small passage is formed in the rim as at 10 to connect the conduit 9 with the groove or channel 5 when the rim is secured in position on the bowl. Formed on the inner and lower edge of the rim 8 is a depending and inwardly extending flange 11 carrying a dish-shaped annular member 12 having a central opening 13 formed therein. The rim 8 also has an overlying annular lip 14 formed upon its upper part and curving inwardly over the dish-shaped member to form a channel 15. At 16 are shown a number of small orifices communicating with the conduit 9 and discharging into the channel 15.

A cone-shaped element is shown at 19 mounted on a stem 17 having a passage 18 therethrough and screwed into the top of ferrule 3. This cone shaped member is somewhat larger in diameter than the opening 13 in member 12, and the stem 17 is of such a length as to support the element 19 over the opening 13 and overlying the member 12.

In the bowl 1 is placed a removable screen 18 adapted to seat in the bowl and receive such refuse as may pass into the bowl through the opening between the cone 19 and element 12.

When the device is assembled as hereinbefore set forth with the supply water pipes 4 and 7, a constant flow of water is maintained over the top surface of the cone-shaped member 16 and over top surface of the member 12, the water discharging on to the latter surface through the orifices 16 from conduit 9. This constant flow of water of course keeps these surfaces clean all waste being carried down into the bowl 1 where the water and all liquid is discharged at the drain 2. To clean the interior of the bowl it is only necessary to shut off the flow of water and then unscrew the stem 17 and then the rim 8. This exposes the entire inside of the bowl so that the screen 18 with its more or less solid contents may be removed.

It is to be understood, of course, that while I have herein shown and described but one specific embodiment of the invention, changes in form, construction, and method of assembly and operation may be made within the scope of the appended claims.

I claim:

1. A cuspidor comprising, a bowl having a groove formed in its upper edge having a water supply pipe communicating therewith, a rim disposed on the bowl to overlie the groove and having a conduit formed therein communicating with said groove and having a plurality of orifices formed therein communicating with the conduit and the interior of the rim, a dished member disposed to receive the water discharged through the orifices and having a central opening therein, a cone shaped member of greater diameter than said opening axially disposed in the bowl, and means for discharging a flow of water over the top surface of the cone shaped member.

2. A cuspidor comprising, a bowl, a dished cap removably mounted thereon and having an opening formed in its center, means for discharging water over the dished cap, a cone shaped member concentrically mounted relative to the dished cap and having a diameter greater than the diameter of the opening in the dished cap and spaced a distance from said cap, and means for discharging water over the top of the cone shaped member.

LAUD E. RUF.